(12) United States Patent
Shaty

(10) Patent No.: US 8,683,201 B2
(45) Date of Patent: Mar. 25, 2014

(54) THIRD-PARTY-SECURED ZONES ON WEB PAGES

(75) Inventor: Shachar Shaty, Rishon Lezion (IL)

(73) Assignee: D&B Business Information Solutions Limited, Dublin (IE)

(*) Notice: Subject to any disclaimer, the term of this patent is extended or adjusted under 35 U.S.C. 154(b) by 1127 days.

(21) Appl. No.: 11/974,833

(22) Filed: Oct. 16, 2007

(65) Prior Publication Data

US 2009/0100505 A1    Apr. 16, 2009

(51) Int. Cl.
*H04L 29/06* (2006.01)
*G06F 21/00* (2013.01)

(52) U.S. Cl.
USPC ............ 713/168; 726/3; 726/22; 713/176

(58) Field of Classification Search
None
See application file for complete search history.

(56) References Cited

U.S. PATENT DOCUMENTS

| | | | |
|---|---|---|---|
| 5,841,970 | A | 11/1998 | Tabuki |
| 5,892,904 | A | 4/1999 | Atkinson et al. |
| 6,023,764 | A | 2/2000 | Curtis |
| 6,029,245 | A | 2/2000 | Scanlan |
| 6,247,133 | B1 | 6/2001 | Palage et al. |
| 6,587,880 | B1 | 7/2003 | Saigo et al. |
| 6,658,394 | B1 | 12/2003 | Khaishgi et al. |
| 7,020,634 | B2 | 3/2006 | Khaishgi et al. |
| 7,092,912 | B2 | 8/2006 | Khaishgi et al. |
| 7,100,049 | B2 | 8/2006 | Gasparini et al. |
| 7,114,177 | B2 | 9/2006 | Rosenberg et al. |
| 7,739,512 | B2* | 6/2010 | Hawkes ................ 713/182 |
| 2002/0059364 | A1 | 5/2002 | Coulthard et al. |
| 2004/0078564 | A1 | 4/2004 | Abdulhayoglu |
| 2004/0210527 | A1 | 10/2004 | Woda et al. |
| 2005/0228782 | A1 | 10/2005 | Bronstein et al. |
| 2005/0268100 | A1 | 12/2005 | Gasparini et al. |
| 2006/0277477 | A1 | 12/2006 | Christenson |
| 2006/0282883 | A1 | 12/2006 | Rosenberg et al. |
| 2007/0240230 | A1 | 10/2007 | O'Connell et al. |

FOREIGN PATENT DOCUMENTS

| | | |
|---|---|---|
| EP | 1159683 | 12/2001 |
| GB | 2 359 904 | 9/2001 |

OTHER PUBLICATIONS

An International Search Report dated Mar. 11, 2010 which issued during the prosecution of Applicant's PCT/IL08/01358.
An International Preliminary Examination Report dated Apr. 21, 2010 which issued during the prosecution of Applicant's PCT/IL08/001358.

(Continued)

*Primary Examiner* — Gilberto Barron, Jr.
*Assistant Examiner* — Izunna Okeke
(74) *Attorney, Agent, or Firm* — Ohlandt, Greeley, Ruggiero & Perle L.L.P.

(57) ABSTRACT

A computer-implemented method is provided, including storing, in an authentication server system, a URL identifying at least one web page, and providing a secure zone browser-side script to be placed on the web page. Upon opening of the web page in a browser, the secure zone browser-side script triggers execution of a server-side script at the authentication server system. The server-side script creates, on the web page, an inline frame, which is controlled by the authentication server system during a session that is associated with the inline frame. The authentication server system retrieves a referrer address from the session, and compares the referrer address with the stored URL. Upon finding a match between the referrer address and the stored URL, the authentication server system delivers web content to or via the inline frame. Other embodiments are also described.

19 Claims, 5 Drawing Sheets

(56) References Cited

OTHER PUBLICATIONS

Verisign Secure Site Seal, www.verisign.com/prg/seal/install.htm, 1999.

Rosenberg, et al., "True SiteTM: Helping on-line companies create trusted brands so their site visitors feel confident enough to stay and play", GeoTrust (Nov. 2001).
IFrames are specified in HTML 4.01 specification, W3C Recommendation Dec. 24, 1999.

* cited by examiner

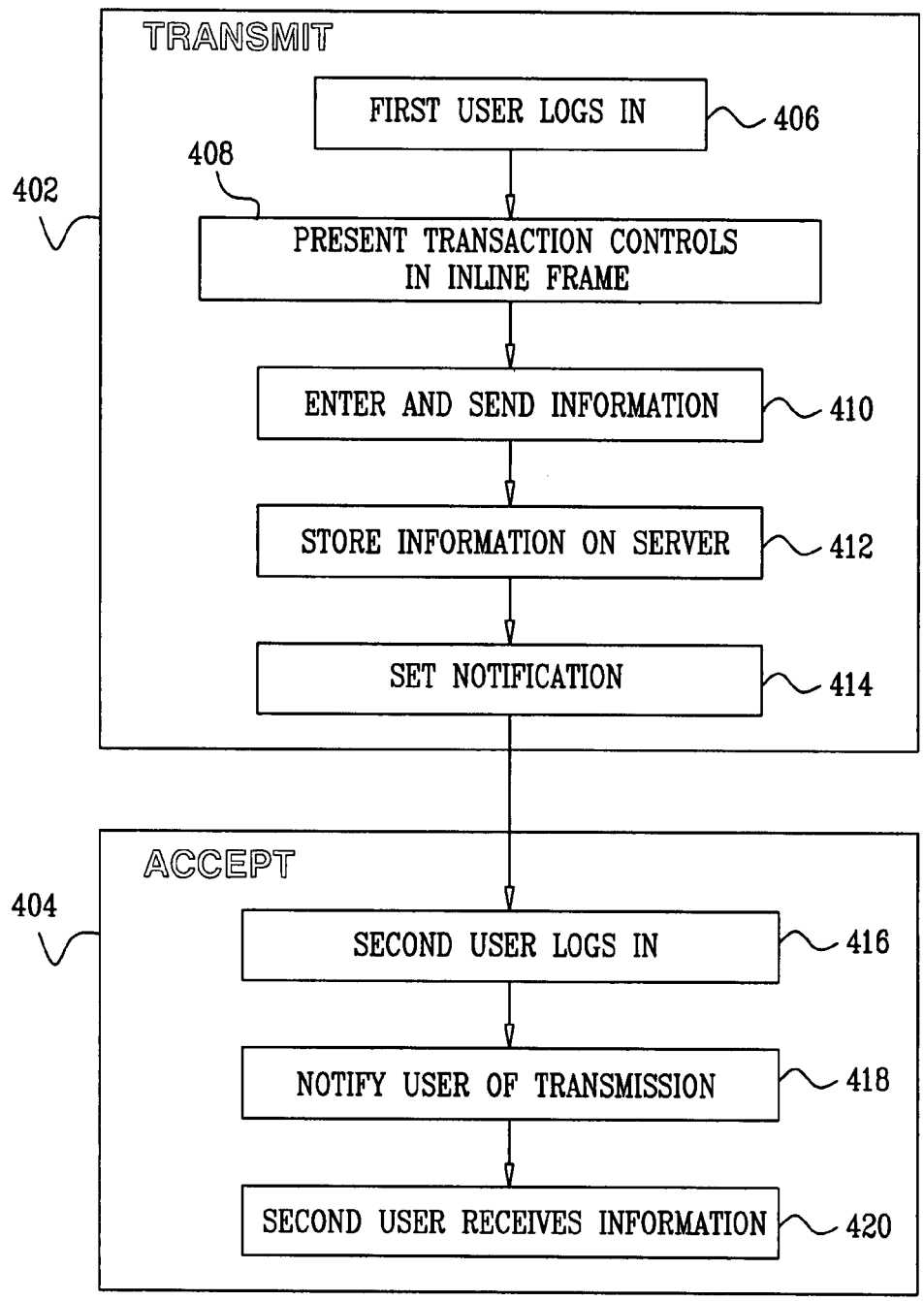

THIRD-PARTY-SECURED ZONES ON WEB PAGES

FIELD OF THE INVENTION

The present invention relates generally to web page content provided by third parties, and more specifically to third-party-secured web page communication.

BACKGROUND OF THE INVENTION

Web pages often display content provided by third-party servers. Various HTML elements are used to provide such content. For example, the HTML tag <IMG SRC . . . > often includes a fully-qualified uniform resource locator (URL) that causes the browser to retrieve and display a graphical image hosted by a third-party server, i.e., a server other than that which is hosting the main web page.

The serving of advertisements, such as banner ads, is one common application of such third-party provisioning of content. To display a web page including third-party-supplied advertising, a web browser first loads HTML content from the server hosting the web page. The HTML content typically includes an indication of the third-party location of the advertising, and, typically, an associated link to the advertiser's website. The browser typically executes a request to the third-party advertising host, which provides in return the media object(s) associated with the advertisement. The browser displays the media object(s) at the appropriate location on the web page.

A number of organizations issue online seals to websites that meet certain criteria, such as a certain level of reliability, maintenance of privacy of personal information, or adherence to business practices. Participating websites display a seal issued by the certification organization. For example, the Council of Better Business Bureau, Inc. operates the BBBOn-Line® Reliability and Privacy Seal Programs. The BBBOn-Line Reliability Seal confirms that a company is a member of its local Better Business Bureau, has been reviewed to meet truth in advertisement guidelines, and follows good customer service practices. Similarly, the non-profit TRUSTe™ organization issues an electronic seal image to organizations that adhere to TRUSTe's established privacy principles and that agree to comply with the TRUSTe oversight and watchdog consumer dispute resolution process. VeriSign, Inc. (Mountain View, Calif.) provides the VeriSign Secured™ Seal to sites that are protected by a VeriSign SSL certificate.

In order to prevent fraudulent use of their seals, most organizations enable the online user to verify the authenticity of the seal. Minimally, clicking on the seal opens a web page served by the organization, which indicates whether the website displaying the seal has been authorized to do so. More sophisticated techniques for preventing fraudulent display of seals have been developed. For example, GeoTrust, Inc. (Needham, Mass.) provides seals that include a live time/date stamp, and/or the name of the company displaying the seal. For example, techniques for displaying and confirming the authenticity of a seal are described in U.S. Pat. No. 7,114,177 to Rosenberg et al., which is assigned to GeoTrust and is incorporated herein by reference, and in a white paper by Rosenberg et al., entitled "True Site™: Helping on-line companies create trusted brands so their site visitors feel confident enough to stay and pay," GeoTrust (November 2001), which is incorporated herein by reference. U.S. Pat. No. 6,658,394 to Khaishgi et al., which is incorporated herein by reference, also describes techniques for issuing electronic seals of certification to online entities.

SUMMARY OF THE INVENTION

In some embodiments of the present invention, a trusted third-party server creates a secure zone on a verified web page, and presents content in the zone to a user who is visiting the verified web page. The secure zone enables secure communication between the user's browser and the third-party server. The third-party server typically uses the zone for presenting web content, and/or for performing secure web-based applications, such as secure login or secure client-to-client transactions or communication. For some applications, the web content includes a verification seal. The third-party server is operated by a trusted third-party service provider, which verifies websites or portions thereof before allowing the use of the secure zone.

In some embodiments of the present invention, the secure zone comprises an inline frame, such as an HTML IFrame or an XFRAME, which the trusted third-party server creates, controls, and populates with web content. Upon verifying at least one uniform resource locator (URL) of a website or a portion thereof, the third-party service provider issues a unique identification code to an entity associated with the URL, and provides a zone script for placement on web pages identified by the URL. When a user opens a web page which includes the zone script, execution of the zone script triggers the execution of a program at the third-party server of the third-party provider. Upon authenticating that the URL has been verified, the program creates an inline frame on the web page, and delivers web content to or via the frame (for example, the program may present the web content in the frame). The program authenticates the URL by retrieving the referrer address (a URL) of the web page from a session between the inline frame and the third-party server, and checking whether this address is contained in a list of verified URLs maintained by the third-party provider. Optionally, the third-party server stores an identifier of the session for subsequent interaction between the user and the third-party server via the secure zone.

The entity's unique identification code is not passed to the user at any point during the creation of the secure zone, display of content in the zone, and subsequent secure communication between the user's browser and the third-party server. Furthermore, the code for placement on the web page typically contains no information specific to the entity or URL. The same code is thus generally placed on web pages identified by a plurality of different URLs controlled by different entities.

In some embodiments of the present invention, the third-party service provider comprises a seal issuer, which enables a web page identified by a verified URL to display a verification seal that is difficult to forge or misuse. Upon creating a secure zone on the web page, as described above, the third-party server presents, in or via the frame, a media object representing the seal. The seal server stores an identifier of the session between the frame and the seal server, for subsequent re-authentication of the user by the third-party server. In some embodiments of the present invention, a method is provided for providing a profile including authentication information and verified information regarding the entity controlling the verified URL. When a user clicks on the seal, the seal server re-authenticates the user by checking whether the user is the same user previously associated with the session during which the seal was displayed in the inline frame. If so, the seal server opens a new window in the user's browser, and presents the verified information regarding the entity associated with the URL, and information that enables the user to confirm the authenticity of the seal and the information displayed.

In some embodiments of the present invention, the third-party service provider provides a login service in the secure zone. Login information (e.g., username and password) entered by the user is transmitted directly to the third-party server. Upon successful verification of the login information, the third-party delivers, to or via the secure zone, web content available only to logged-in users.

In some embodiments of the present invention, the third-party service provider provides a secure communication service in the secure zone. A first user uses a first secure zone on a first web page to send information to a second user, who retrieves the information via a second secure zone typically on a second web page.

There is therefore provided, in accordance with an embodiment of the present invention, a computer-implemented method including:

storing, in an authentication server system, a URL identifying at least one web page;

providing a secure zone browser-side script to be placed on the web page;

upon opening of the web page in a browser, triggering, by the secure zone browser-side script, execution of a server-side script at the authentication server system;

creating on the web page, by the server-side script, an inline frame, which is controlled by the authentication server system during a session that is associated with the inline frame;

retrieving, by the authentication server system, a referrer address from the session;

comparing, by the authentication server system, the referrer address with the stored URL; and upon finding a match between the referrer address and the stored URL, delivering, by the authentication server system, web content to or via the inline frame.

In an embodiment of the present invention, the web content includes a seal media object, and delivering the web content includes presenting the seal media object in or via the inline frame.

For some applications, storing the URL includes storing the URL in association with verification information in the authentication server system, and further including:

upon finding the match between the referrer address and the stored URL, storing, by the authentication server system, an identifier of the session;

receiving an indication at the authentication server system that at least a portion of the seal media object has been activated by a user requesting the verification information;

responsively to the indication, authenticating, by the authentication server system, using the stored identifier of the session, that the seal media object has been activated in the session; and responsively to the authenticating, presenting, by the authentication server system, the verification information to the user, in or via the inline frame.

In an embodiment of the present invention, the URL includes a first URL, the web page includes a first web page, storing the URL includes storing the first URL and a second URL identifying at least one second web page, and providing the secure zone browser-side script includes providing the same secure zone browser-side script to be placed on the first web page and on the second web page.

In an embodiment of the present invention, the inline frame includes an HTML IFrame, and creating the inline frame includes creating the HTML IFrame on the web page.

In an embodiment of the present invention, the method further includes, upon finding the match between the referrer address and the stored URL, storing, by the authentication server system, an identifier of the session. For some applications, the method further includes:

receiving an indication at the authentication server system of an interaction of a user with the web content delivered to or via the inline frame;

responsively to the indication, authenticating, by the authentication server system, using the stored identifier of the session, that the interaction occurred in the session; and responsively to the authenticating, performing, by the authentication server system, at least one step selected from the group consisting of: modifying at least a portion of the web content delivered to or via the inline frame, presenting information in the inline frame, and presenting information in a window of the browser opened via the inline frame.

The identifier of the session may include a random key, and storing the identifier of the session includes storing the random key in an object that represents the session. Alternatively or additionally, storing the identifier of the session includes retrieving a session ID from an object that represents the session. Further alternatively or additionally, storing the URL includes assigning an entity ID to an entity associated with the URL, and storing the identifier of the session includes storing the entity ID. Typically, the method does not include communicating the entity ID to the browser.

Alternatively or additionally, storing the identifier of the session includes retrieving and storing an IP address of the browser.

In an embodiment of the present invention, the web content includes login controls, and the method further includes: entering login information by a user using the login controls; authenticating the login information by the authentication server system; and delivering, by the authentication server system, restricted-access content to or via the inline frame.

In an embodiment of the present invention, the URL includes a first URL, the web page includes a first web page, and the inline frame includes a first inline frame, the web content includes first web content including transmission controls, storing the URL includes storing the first URL and a second URL, which identifies a second web page, creating further includes creating, on the second web page, a second inline frame, delivering the web content further includes delivering, to or via the second inline frame, second web content including receipt controls, and the method further includes sending, via the authentication server system, by a first user of the first website, using the transmission controls, information to a second user of the second website; and receiving the information by the second user, using the receipt controls.

For some applications, the web content includes streaming content, and delivering the web content includes leaving the inline frame open while delivering the streaming content.

There is further provided, in accordance with an embodiment of the present invention, apparatus including:

an interface for communicating with a browser over a network;

a memory, configured to store a URL identifying at least one web page having thereon a secure zone browser-side script; and a processor, configured to execute a server-side script triggered by the secure zone browser-side script upon opening of the web page in the browser, which server-side script causes the processor to create on the web page an inline frame, which is controlled by the processor during a session that is associated with the inline frame, and the processor is configured to retrieve a referrer address from the session, compare the referrer address with the stored URL, and upon finding a match between the referrer address and the stored URL, deliver web content to or via the inline frame via the interface.

There is still further provided, in accordance with an embodiment of the present invention, a computer software product including a tangible computer-readable medium in which program instructions are stored, which instructions, when read by a computer, cause the computer to store a URL identifying at least one web page having thereon a secure zone browser-side script, and execute a server-side script triggered by the secure zone browser-side script upon opening of the web page in a browser, which server-side script causes the computer to create on the web page an inline frame, which is controlled by the computer during a session that is associated with the inline frame, and the instructions, when read by the computer, cause the computer to retrieve a referrer address from the session, compare the referrer address with the stored URL, and upon finding a match between the referrer address and the stored URL, deliver web content to or via the inline frame.

The present invention will be more fully understood from the following detailed description of embodiments thereof, taken together with the drawings, in which:

BRIEF DESCRIPTION OF THE DRAWINGS

FIG. 6 is a flow chart that schematically illustrates a method for secure client-to-client transactions, in accordance with an embodiment of the present invention.

DETAILED DESCRIPTION OF EMBODIMENTS

Figure 1:
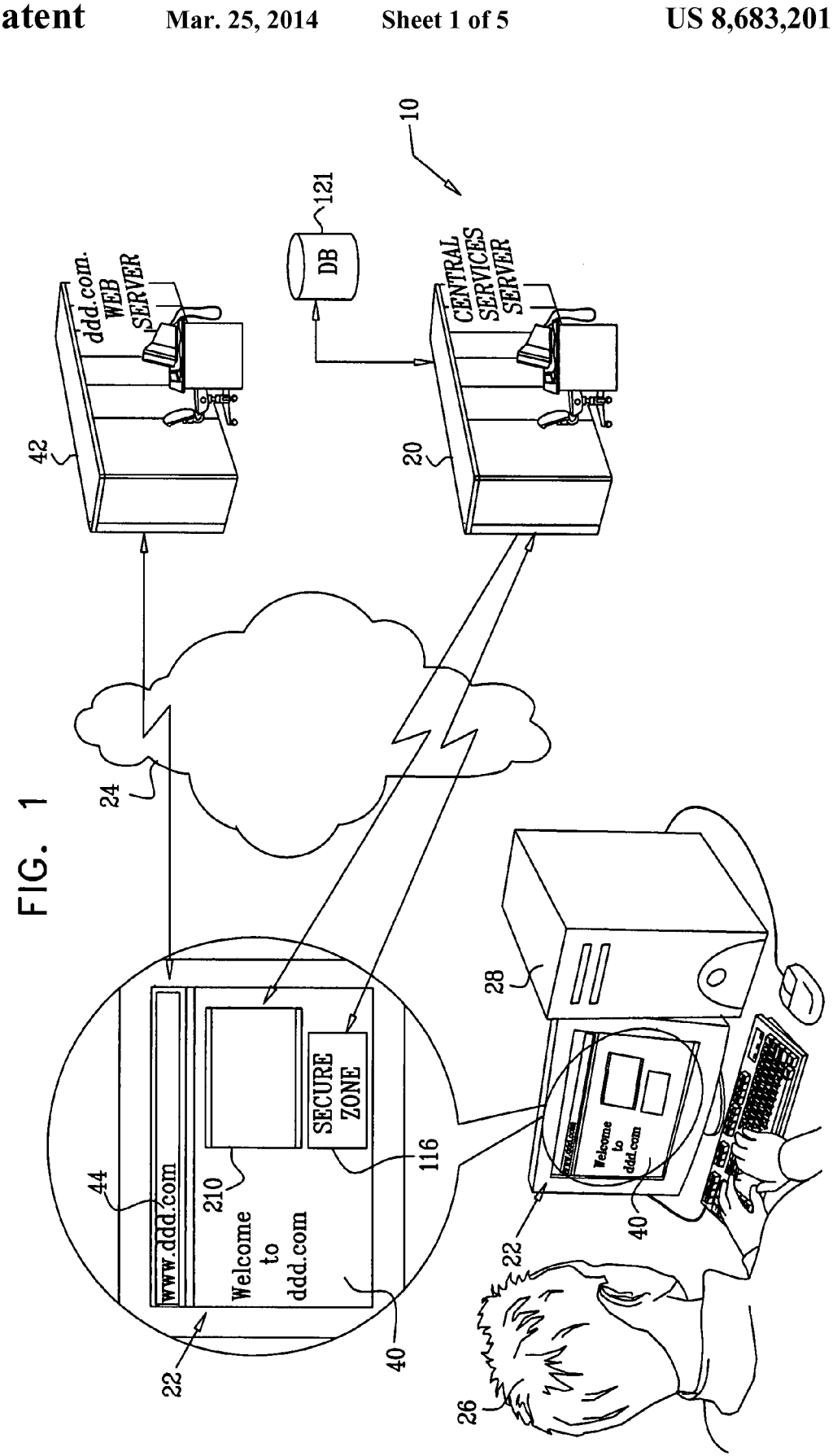
FIG. 1 is a schematic, pictorial illustration showing a secure zone system, in accordance with an embodiment of the present invention.

FIG. 1 is a schematic, pictorial illustration showing a secure zone system 10, in accordance with an embodiment of the present invention. System 10 comprises a central services server 20, which comprises a Web server that communicates with a Web browser 22 over a wide area network (WAN) 24, such as the Internet. A user 26 operates the Web browser, which is typically implemented using conventional browser software running on a personal computer or workstation 28, as is known in the art.

Central services server 20 typically comprises at least one general-purpose computer workstation, having a processor, an interface with WAN 24, and, optionally, a user interface. Software for carrying out the process management functions of central services server 20 may be provided to the server in electronic form, over a network, for example, or it may alternatively be furnished on tangible media, such as optical, magnetic or electronic memory media. Central services server 20 comprises web serving functionality, which is typically provided by a web server that runs on the same workstation that provides the other functionality of server 20 described herein, or runs on a separate server or workstation. The Web serving functionality of system 10 may be distributed over a plurality of Web servers, as is known in the art.

In an embodiment of the present invention, a third-party service provider operates system 10. The service provider verifies a plurality of uniform resource locators (URLs) (websites or portions of websites). For example, the service provider may verify a URL including a domain name of a website including a plurality of web pages, such as, for example, "www.ddd.com", or one or more URLs within a domain name, such as all web pages identified by URLs which begin with "www.ddd.com/store". The websites are typically operated by entities not otherwise legally affiliated with the third-party service provider. Typically, the verification includes verifying a relationship between an entity and the URL. To perform such verification, the third-party service provider typically verifies that the URL is associated with the entity, and/or information regarding the website and/or the operator of the website, such as the legal identity, credentials, policies, and/or business practices of the operator of the website. The third-party service provider typically stores the URL in association with verification information, such as information regarding the entity, e.g., a profile of the entity. The third-party service provider typically issues a unique identification code to the entity.

Figure 2:
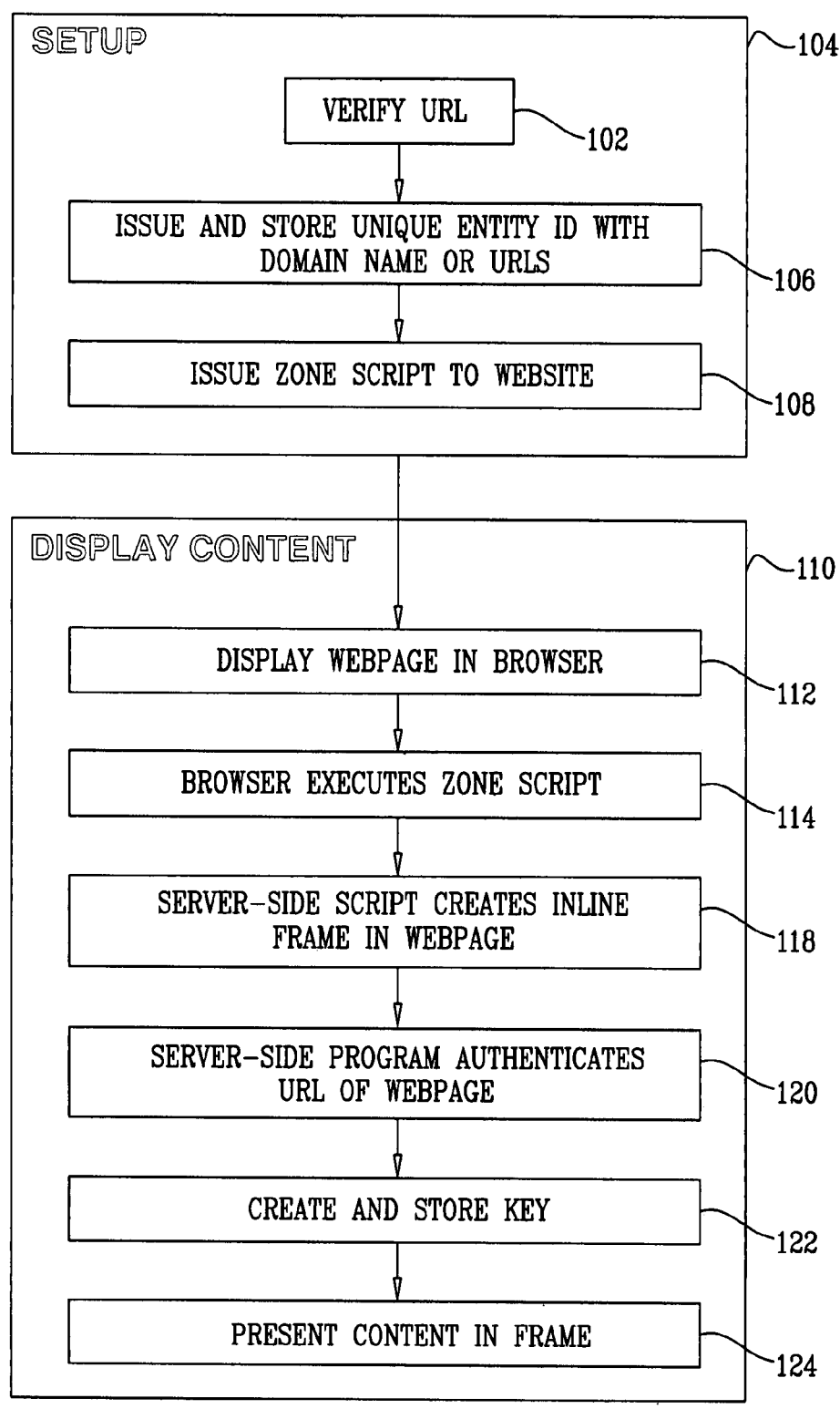
FIG. 2 is a flow chart that schematically illustrates a method for displaying web content in a secure zone of a web page, in accordance with an embodiment of the present invention.

Reference is made to FIG. 2, which is a flow chart that schematically illustrates a method 100 for seamless authentication of a URL and presenting web content in a secure zone on a web page, in accordance with an embodiment of the present invention. As shown in FIG. 1, an operator of a website hosts at least one web page 40 of the website on at least one Web server 42. The web page has a URL 44, such as the exemplary domain name "www.ddd.com" shown in the figure. Web server 42 communicates with browser 22 over WAN 24. Method 100 enables the display of web content, typically HTML content, within web page 40 or another window in browser 22. The web content may comprise, for example, graphical content, text content, streaming media content, audio content, other media content, or other objects supported by HTML or browsers, such as user controls, Microsoft® ActiveX controls, and/or Java™ applets, which may provide static or dynamic information, and/or enable interaction with the user. For some applications, the web content is delivered by a party external to both the operator of the website and the third-party service provider, such as advertisements or news. The information may be sent using protocols such as RSS or other online streaming protocols.

At a website verification step 102 during a setup portion 104 of method 100, the third-party service provider verifies at least one characteristic of URL 44, such as an association between the URL and an entity controlling the URL, such as described hereinabove. Upon verifying the URL, the third-party service provider issues a unique identification code to the entity controlling the URL (an "entity ID"), and stores the entity ID and information regarding the identify, in association with the URL, in one or more databases of system 10, at an issue and store entity ID step 106. The service provider provides a secure zone script for placement on web page 40, at a zone code issuance step 108. For some applications, the zone is visible on the web page, in which case the zone script is generally placed on web page 40 at a desired location for displaying the web content. For other applications, the zone is invisible, and may display content, for example, by causing the opening of an additional window in the browser.

During a display portion 110 of method 100, user 26 opens web page 40 in browser 22, at a display web page step 112. The opening of the web page in the browser causes the browser to execute the zone script included in the web page, at a zone script execution step 114. Execution of the zone script by the browser triggers the execution of a server-side script at central services server 20 (FIG. 1) of the third-party service provider. The zone script typically is written in a client-side scripting language, such as JavaScript or VBScript. For example, the zone code may include the following JavaScript code:

Listing 1

```
<script language="JavaScript"
src="http://www.tpstaging.com/Jscripts/TpSecureZone.js"
type="text/javascript"></script>
```

The server-side script creates an inline frame 116 (FIG. 1), such as an HTML IFrame, at the location of the zone code on web page 40, at a frame creation step 118. An IFrame is an HTML element that enables the embedding of another HTML document inside a main document. IFrames are specified in HTML 4.01 Specification, W3C Recommendation 24 Dec. 1999, which is incorporated herein by reference. Alternatively, web page 40 itself includes an HTML element that creates the inline frame, which is populated by server-side code called by the zone script.

The use of an inline frame enables central services server 20 to set up a direct connection (which is typically secure) with web page 40, i.e., not via Web server 42 that is serving web page 40 outside of the frame. As a result, central services server 20 has direct and exclusive control over the section of web page 40 occupied by inline frame 116. Creation of the inline frame causes the web serving functionality of central services server 20 to create a session between the inline frame and central services server 20. For example, the web serving functionality may place a cookie on the computer in which the browser is running in order to maintain the session, as is known in the art. (Although browser- and server-side scripts are generally described in the present application, including in the claims, as executing various processes, it is to be understood that associated computer processors actually execute these various processes responsively to software instructions contained in the scripts.)

After creating the inline frame, the server-side script calls a server-side program running on central services server 20, which performs the remainder of the steps of display portion 110 of method 100. Alternatively, the server-side script itself performs all or a portion of these remaining steps.

The server-side script is written in a server-side scripting language, such as JavaScript or VBScript. The name and location of the server-side script is indicated by the zone code (in the exemplary code above, by the SRC attribute). The server-side script, for example, may include the following JavaScript code:

Listing 2

```
document.write("<iframe id='Iframe1'
src='http://www.tpstaging.com/TpSecureZone.aspx'
width='130px' height='90px' frameborder='0'
scrolling='no'></iframe>");
```

At a website authentication step 120, the server-side program authenticates that a web address of web page 40 (URL 44) is registered with central services server 20. The server-side program determines the URL by retrieving the referrer address from the session of the inline frame, for example using the HTTP_REFERER variable, and checks whether the web address was registered at step 106 above. It is noted that at no point during this authentication process is any client- or website-specific data transferred over the Internet in a decipherable way.

For some applications, after authenticating the web address, the server-side program stores an identifier of the session between the inline frame and the central services server. For some applications, the identifier comprises a session key, which comprises: (a) a random, unique value, (b) optionally, the entity ID, and, optionally, (c) the IP address of the browser 22 client (retrieved using the REMOTE_ADDR variable), and stores the key as a record in a data repository 121 (e.g., one or more tables, or a relational database) stored on or in communication with central services server 20, at a key creation and storage step 122.

For some applications, the server-side program also stores the session key in the session between the inline frame and the central services server. For example, the server-side program may use a Microsoft® Active Server Pages (ASP) Session Object for this purpose (e.g., using the statement "Session ["Key"]=CreateRandomKey( );"). For some applications, central services server 20 uses this stored key at step 202 of method 200, described hereinbelow with reference to FIG. 4. The use of the session key obviates any need to send the entity ID to browser 22 throughout the content serving processes described herein.

Alternatively, for some applications, rather than creating a random value for storage in the key at step 122 above, the server-side program retrieves the ASP Session ID automatically created when the session between the inline frame and the central services server was created, and includes this value in the key. For these applications, the server-side program does not necessarily store the key in the Session Object, because the Session Object already includes the ASP Session ID which is used later at step 202 of method 200 to confirm the identify of the session. For applications in which the server-side program uses a server-side scripting language other than ASP that supports sessions, the server-side program retrieves the session ID from these sessions.

At a web content presentation step 124, the server-side program delivers web content to inline frame 116 or via inline frame 116 (e.g., by opening a new window in the browser via the inline frame), thereby concluding display portion 110 of method 100. The inline frame session typically, but not necessarily, remains open after delivering the content. For some applications, such as when the web content includes streaming content, the inline frame is left open for displaying the content.

Figure 3:
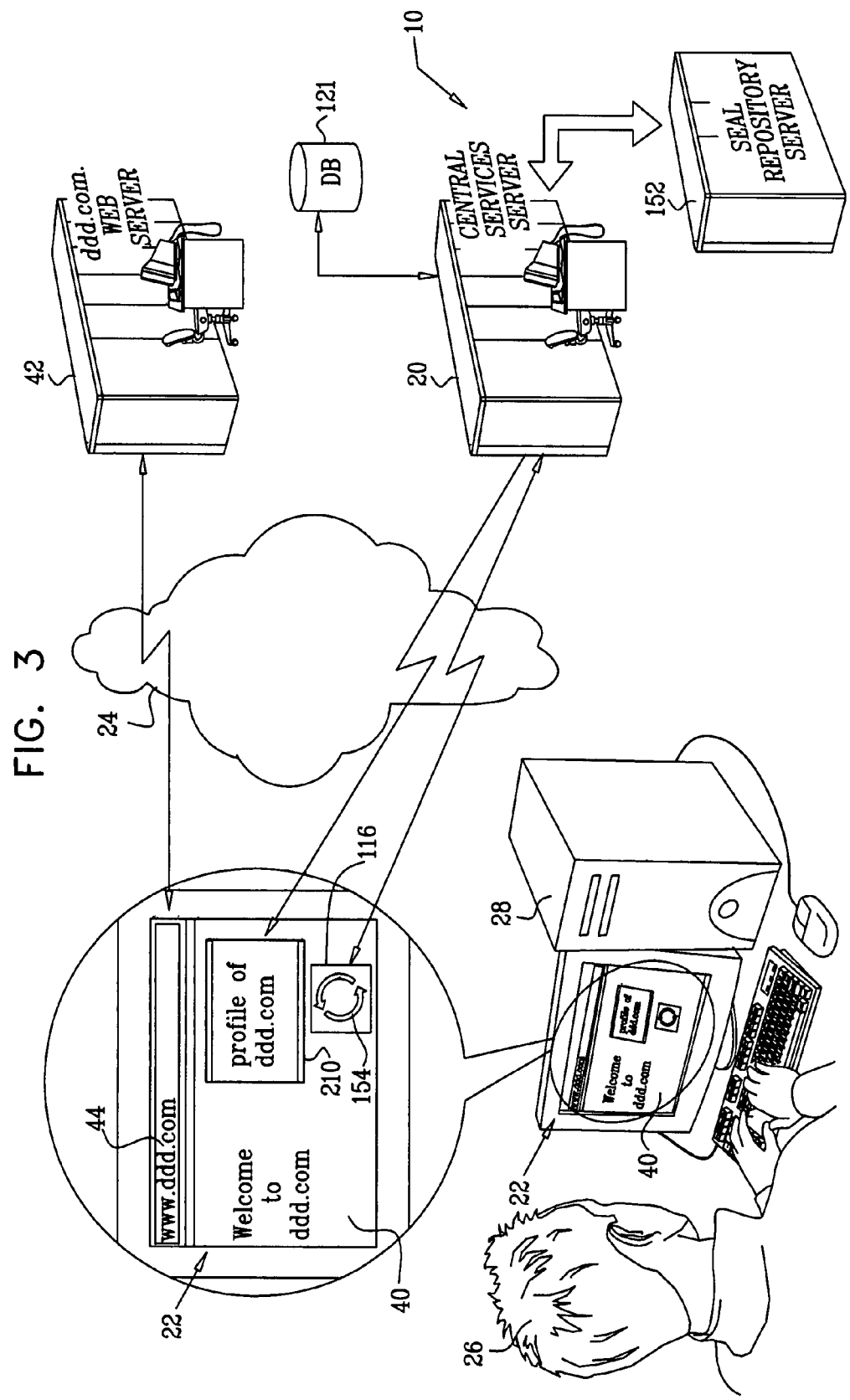
FIG. 3 is a schematic, pictorial illustration showing a verification seal system, in accordance with an embodiment of the present invention.

Reference is made to FIG. 3, which is a schematic, pictorial illustration showing an authentication seal system 150, in accordance with an embodiment of the present invention. Authentication seal system 150 represents one implementation of secure zone system 10, described hereinabove with reference to FIGS. 1 and 2. In addition to the elements of system 10, authentication seal system 150 comprises at least one seal repository server 152, which may run on a separate workstation, as shown in FIG. 1, or on the same workstation on which central services server 20 runs (configuration not shown). Each seal repository server 152 comprises at least one general-purpose computer workstation, having a processor and at least one interface. Seal repository server 152 is typically protected by a firewall. For some applications, system 150 comprises separate seal repository servers 152 for different geographic regions, such as different countries.

In an embodiment of the present invention, to display an authentication seal in the secure zone defined by inline frame 116, the third-party service provider and authentication seal system 150 use method 100, described hereinabove with reference to FIG. 2, modified as follows. Upon authenticating a website, or a portion thereof, at authentication step 102, the third-party service provider typically also stores additional certification information regarding the website and/or its operator, such as described hereinabove, in seal repository server 152, for display during a seal verification procedure, as described hereinbelow with reference to FIG. 3. For some applications, at key creation and storage step 122, the server-side program stores the session key in seal repository 152. At web content presentation step 124, the server-side program populates inline frame 116 with a seal media object 154.

Figure 4:
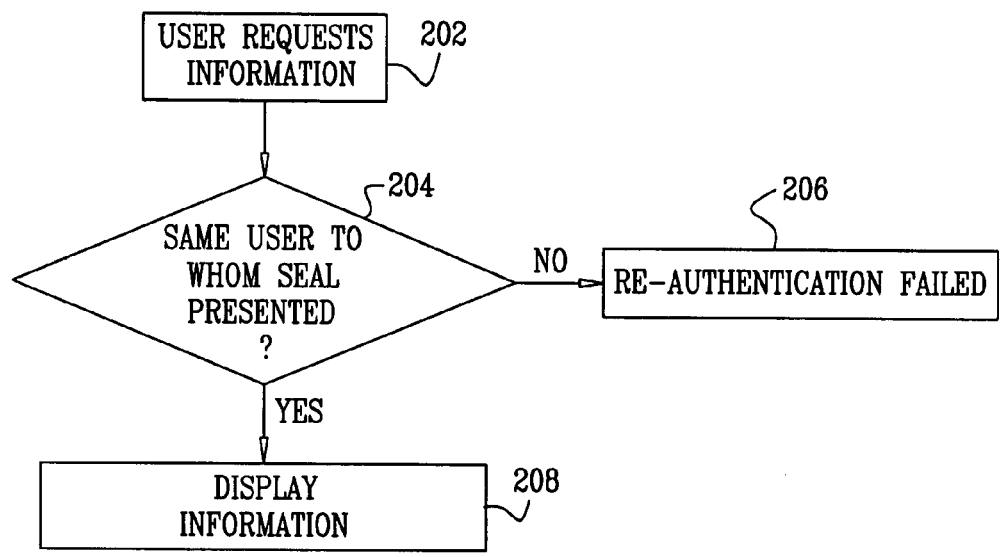
FIG. 4 is a flow chart that schematically illustrates a method for providing a profile including verified information, in accordance with an embodiment of the present invention.

Reference is made to FIG. 4, which is a flow chart that schematically illustrates a method 200 for providing a profile including verified information, in accordance with an embodiment of the present invention. Method 200 begins when a user requests information regarding the entity associated with the URL, by activating at least a portion of media object 154, typically by clicking on it, at a request information step 202. At a user re-authentication check step 204, central services server 20 checks whether the user is the same user 26 previously associated with the inline frame session created by central services server 20 at step 118 of method 100, described with reference to FIGS. 2 and 3 hereinabove.

For some applications, to perform this re-authentication check the central services server constructs an authentication key that comprises:
 the random value stored at step 122 of method 100 above, which is now retrieved by the central services server from the Session Object. If the information-requesting user is the same as user 26 to whom the seal was displayed at step 124 of method 100 above, the same inline frame session continues, so the same random value is retrieved that was earlier stored. If, on the other hand, the information-requesting user is any user other than user 26, or the session has timed out, the server is not able to retrieve the same random value, because the information-requesting user has a different session from the session created for user 26. Alternatively, for applications in which the server-side program does not create a random key at step 122 of method 100 of FIG. 2, the authentication key comprises the Session ID, rather than the random value;
 optionally, the entity ID; and
 optionally, the IP address of the browser 22 client (retrieved using the REMOTE_ADDR variable).

The central services server attempts to look up this authentication key in the data repository 121 in which the key was stored at step 122 of method 100 above (which, as mentioned, for some applications is stored in seal repository server 152). If there is no match in the database between this random value-IP combination and one of the keys stored earlier, re-authentication of the user fails, at a failed verification step 206. For example, the information-requesting user may be trying to spoof the user 26, or the session may have timed out. Typically, the central services server stores the IP address of the failed information-verifying user for later analysis.

Alternatively, for applications in which the key created at step 122 of method 100 includes the ASP Session ID instead of a random value, as described hereinabove, the authentication key includes the ASP Session ID of the current session, rather than the value retrieved from the Session Object.

On the other hand, if the same user 26 is confirmed to be requesting information at check step 204, the entity ID of the key is returned from the database. At a verification information display step 208, central services server 20, or seal repository server 152, using the entity ID, retrieves additional information regarding the entity and/or the URL from seal repository server 152, and displays this information to user 24. This information is typically displayed in a pop-up window 210 opened for this purpose over the same open session, either at step 208 or prior thereto, such at step 202, or, alternatively, by redirecting the window in which the zone is located.

In an embodiment of the present invention, the techniques of method 200, described hereinabove with reference to FIG. 4, are used for re-authenticating a user for applications other than presenting a seal, such as for other applications described herein.

Figure 5:
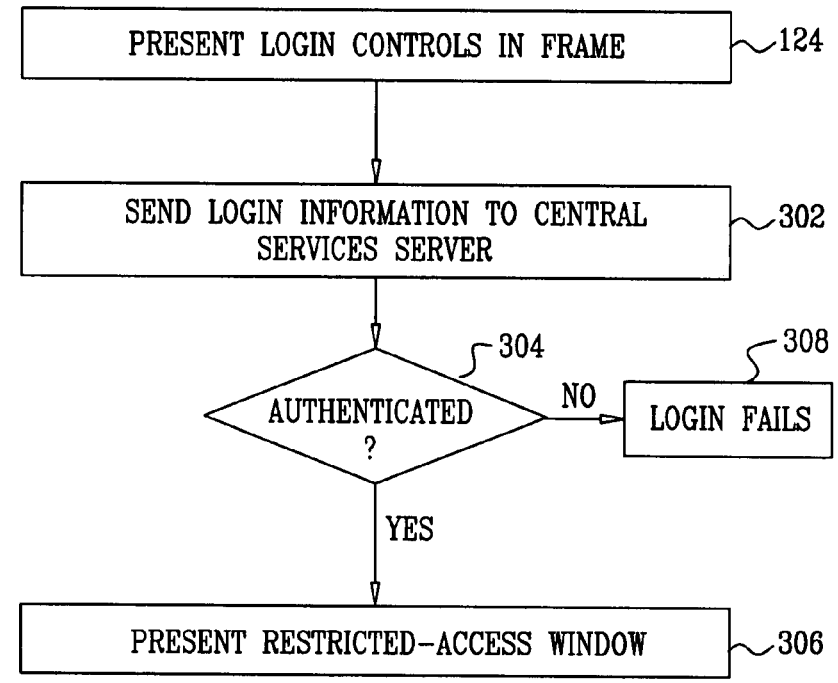
FIG. 5 is a flow chart that schematically illustrates a method for secure login, in accordance with an embodiment of the present invention.

Reference is made to FIG. 5, which is a flow chart that schematically illustrates a method 300 for secure login, in accordance with an embodiment of the present invention. Method 300 enables user 26 viewing web page 40 to securely log into a service or system offered by the third-party service provider, via the secure zone provided by inline frame 116. The method begins at content presentation step 124 of method 100 of FIG. 2, after the earlier steps of method 100 have been completed, such that inline frame 116 has been created on web page 40. At step 124 of method 100, the server-side program populates inline frame 116 with login controls, such as text boxes for entering a username and password, and other login-related information, such as login instructions. When the user submits the login information, the information is sent to central services server 20 for authentication, at a send information step 302. Server 20 checks whether the login information is correct, at an authentication check step 304. If the server finds that the login information is correct, the user is logged in, and the server delivers restricted-access web content to the user, to or via the inline frame, typically by redirecting the current active browser window, opening a new window in the browser, or populating the inline frame, at a restricted-access window presentation step 306. If the login information is found to be incorrect, login fails, at a login failure step 308. For some applications, during the login process, such as when the user submits the login information, the third-party server re-authenticates the user, using the re-authentication techniques described hereinabove with reference to step 204 of method 200 of FIG. 4.

Reference is made to FIG. 6, which is a flow chart that schematically illustrates a method 400 for secure client-to-client transactions, in accordance with an embodiment of the present invention. Method 400 enables a first user 26 viewing web page 40 to securely transmit information to at least one second user 26, via the third-party service provider. Method 400 includes a transmit phase 402, followed by an accept phase 404. Transmit phase 402 optionally begins at a login step 406, at which first user 26 performs a secure login via inline frame 116, using method 300 described hereinabove with reference to FIG. 5. Alternatively, the transmit phase begins without secure login, after inline frame 116 has been created, as described hereinabove with reference to steps 102 through 122 of method 100 of FIG. 2.

At a transaction controls presentation step 408, the server-side program populates inline frame 116, or another window generated via the inline frame, with transaction controls that, for example, allow the first user to enter a message and/or select files for transmission. The transaction controls also enable the first user to enter a destination address, such as an alphanumeric user ID, and to give a send instruction. Using the controls in the inline frame, the user enters information (e.g., a message and/or one or more files), and sends the information, at a send information step 410. For some applications, during information sending process, such as when the user submits an indication to send the information, the third-party server re-authenticates the user, using the re-authentication techniques described hereinabove with reference to step 204 of method 200 of FIG. 4. Server 20 stores the transmitted information, at an information storage step 412. The server also sets a notification for the recipient, at a set notification step 414.

Accept phase 404 optionally begins at a login step 416, at which a second user 26 performs a secure login via inline frame 116, using method 300 described hereinabove with reference to FIG. 5. Alternatively, the accept phase begins without secure login, after inline frame 116 has been created, as described hereinabove with reference to steps 102 through 122 of method 100 of FIG. 2.

At a notification step 418, the server-side program populates inline frame 116, or another window generated via the inline frame, with a notification that the transmitted information has been sent. The second user selects the information for retrieval, such as viewing and/or downloading from server 20, at a receipt step 420. For some applications, during the information retrieval process, such as when the user submits a request for retrieval, the third-party server re-authenticates the user, using the re-authentication techniques described hereinabove with reference to step 204 of method 200 of FIG. 4.

For some applications, transmission of information is performed on an entity level, i.e., information is sent from a first entity (e.g., "www.ddd.com") to a second entity (e.g., "www.eee.com"), each of which has a unique ID. Typically, any user logged into the first entity can send information, and any user logged into the second, receiving entity can view and/or download the transmitted information.

For other applications, transmission of information is performed on a user level, i.e., information is sent from a first user to a second user, each of which has a unique user ID. Each user can log into any web page participating in the information transmission service offered by the third-party service provider.

For some applications, method 400 is used to enable client-to-client transactions beyond information exchange, such as trading or other business transactions. For these applications, the information communicated using the method relates to such transactions.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method comprising:
    storing, in an authentication server system, a URL identifying a web page, resulting in a stored URL;
    providing a browser-side script to be placed on the web page;
    upon opening of the web page in a browser, triggering, by the browser-side script, execution of a server-side script at the authentication server system;
    creating on the web page, by the server-side script, a secure zone comprising an inline frame, which is controlled by the authentication server system during a session that is associated with the inline frame;
    retrieving, by the authentication server system, a referrer address from the session of the inline frame using an HTTP_REFERER variable;
    comparing, by the authentication server system, the referrer address to the stored URL;
    delivering, by the authentication server system, web content to, or via the secure zone, upon finding a match between the referrer address and the stored URL;
    storing an identifier of the session, by the authentication server system, upon finding the match between the referrer address and the stored URL;
    receiving an indication, at the authentication server system, of an interaction of a user with the web content delivered;
    authenticating, by the authentication server system, responsively to the indication, using the stored identifier of the session, that the interaction occurred in the session; and
    performing, by the authentication server system, responsively to the authenticating, at least one step selected from the group consisting of: modifying at least a portion of the web content delivered to or via the secure zone, presenting information to the secure zone, and presenting information in a window of the browser opened via the secure zone.

2. The method according to claim 1, wherein the web content comprises a seal media object, and wherein delivering the web content comprises presenting the seal media object in or via the inline frame.

3. The method according to claim 2, wherein storing the URL further comprises associating the URL with verification information, in the authentication server system, the method further comprising:
    storing an identifier of the session, by the authentication server system, upon finding the match between the referrer address and the stored URL, resulting in a stored identifier;
    receiving an indication at the authentication server system that at least a portion of the seal media object has been activated by a user requesting the verification information;
    authenticating, responsively to the indication by the authentication server system, using the stored identifier of the session, that the seal media object has been activated in the session; and
    presenting, responsively to the authenticating by the authentication server system, the verification information to the user, in or via the inline frame.

4. The method according to claim 1, wherein the URL comprises a first URL, wherein the at least one web page comprises a first web page, wherein storing the URL comprises storing the first URL and a second URL identifying a second web page, and wherein providing the browser-side script comprises providing a same browser-side script to be placed on the first web page and on the second web page.

5. The method according to claim 1, wherein the secure zone comprises an HTML IFrame, and wherein creating the secure zone comprises creating the HTML IFrame on the web page.

6. The method according to claim 1, wherein the identifier of the session comprises a random key, and wherein storing the identifier of the session comprises storing the random key in an object that represents the session.

7. The method according to claim 1, wherein storing the identifier of the session comprises retrieving a session ID from an object that represents the session.

8. The method according to claim 1, wherein storing the URL comprises assigning an entity ID to an entity associated with the URL, and wherein storing the identifier of the session comprises storing the entity ID.

9. The method according to claim 8, wherein the method does not comprise communicating the entity ID to the browser.

10. The method according to claim 1, wherein storing the identifier of the session comprises retrieving and storing an IP address of the browser.

11. The method according to claim 1, wherein the web content comprises login controls, the method further comprising:
receiving, at the authentication server, login information entered by a user using the login controls;
authenticating the login information by the authentication server system; and
delivering, by the authentication server system, restricted-access web content to or via the secure zone.

12. The method according to claim 1,
wherein the URL comprises a first URL,
wherein the at least one web page comprises a first web page, the secure zone comprises a first inline frame,
wherein the web content comprises first web content comprising transmission controls,
wherein storing the URL comprises storing the first URL and a second URL, which identifies a second web page,
wherein creating further comprises creating, on the second web page, a second inline frame, and
wherein delivering the web content further comprises delivering, to or via the second inline frame, second web content comprising receipt controls, and further comprising:
sending, via the authentication server system, by a first user of the first website, using the transmission controls, information to a second user of the second website; and
receiving the information by the second user, using the receipt controls.

13. The method according to claim 1, wherein the web content comprises streaming content, and wherein delivering the web content comprises leaving the secure zone open while delivering the streaming content.

14. An apparatus comprising:
an interface for communicating with a browser over a network;
a memory, configured to store a URL identifying a web page having thereon a browser-side script, wherein the memory is configured to store the URL in association with verification information; and
a processor, configured to execute a server-side script triggered by the browser-side script upon opening of the web page in the browser, which server-side script causes the processor to:
create on the web page a secure zone comprising an inline frame, which is controlled by the processor during a session that is associated with the inline frame, wherein the processor is configured to retrieve a referrer address from the session of the inline frame using an HTTP_REFERER variable;
compare the referrer address with the stored URL;
upon finding a match between the referrer address and the stored URL, deliver web content to, or via the secure zone, wherein the web content comprises a seal media object, and wherein the processor is configured to present the seal media object in or via the inline frame;
store, upon finding the match between the referrer address and the stored URL, an identifier of the session in the memory;
receive an indication that at least a portion of the seal media object has been activated by a user requesting the verification information;
authenticate, responsively to the indication, using the stored identifier of the session, that the seal media object has been activated in the session; and
present, responsively to authenticating, the verification information to the user, in or via the secure zone.

15. The apparatus according to claim 14, wherein the URL comprises a first URL, wherein the web page comprises a first web page, and wherein the memory is configured to store the first URL, and to store a second URL identifying at least a second web page having thereon a same browser-side script as is on the first web page.

16. The apparatus according to claim 14, wherein the processor is configured to, upon finding the match between the referrer address and the stored URL, store an identifier of the session in the memory.

17. The apparatus according to claim 16, wherein the processor is configured to:
receive an indication of an interaction of a user with the web content delivered to or via the secure zone;
authenticate, responsively to the indication, using the stored identifier of the session, that the interaction occurred in the session; and
perform, responsively to the authenticating, at least one action selected from the group consisting of: modifying at least a portion the web content delivered to or via the secure zone, presenting information in the secure zone, and presenting information in a window of the browser opened via the secure zone.

18. The apparatus according to claim 14, wherein the URL comprises a first URL, the web page comprises a first web page, and the secure zone comprises a first inline frame, wherein the web content comprises first web content comprising transmission controls, wherein the memory is configured to store a second URL identifying a second web page having the browser-side script thereon, and wherein the processor is configured to:
create, on the second web page, a second secure zone including a second inline frame;
deliver, to or via the second inline frame, second web content comprising receipt controls;
receive information sent by a first user of the first website, responsively to use by the first user of the transmission controls; and
transmit the information to a second user of the second website, responsively to use by the second user of the receipt controls.

19. A non-transitory tangible computer-readable medium comprising program instructions which program instructions, when read by a computer, cause the computer to:
store a URL identifying a web page having a browser-side script thereon, resulting in a stored URL;
execute a server-side script triggered by the browser-side script upon opening of the web page in a browser, the server-side script causes the computer to create a secure zone comprising an inline frame on the web page, wherein the inline frame is controlled by the computer during a session associated with the inline frame,
retrieve a referrer address from the session of the inline frame using an HTTP_REFERER variable;
compare the referrer address with the stored URL;

deliver web content to or via the secure zone, upon finding a match between the referrer address and the stored URL, wherein the web content comprises a seal media object, and wherein the instructions, when read by the computer, cause the computer to present the seal media object in or via the inline frame;

store the URL in association with verification information;

store, upon finding the match between the referrer address and the stored URL, an identifier of the session;

receive an indication that at least a portion of the seal media object has been activated by a user requesting the verification information;

authenticate, responsively to the indication, using the stored identifier, that the seal media object has been activated in the session; and present, responsively to authenticating, the verification information to the user, in or via the secure zone.

* * * * *